(12) United States Patent
Duncan et al.

(10) Patent No.: US 9,216,787 B2
(45) Date of Patent: Dec. 22, 2015

(54) ELECTRIC VEHICLE

(71) Applicant: Mahindra Tractor Assembly, Inc., Palo Alto, CA (US)

(72) Inventors: Terence Duncan, Canton, MI (US); Axel Vollmer, Ann Arbor, MI (US); Roger Evans, Ann Arbor, MI (US); Joseph Bertrand, Canton, MI (US)

(73) Assignee: MAHINDRA TRACTOR ASSEMBLY, INC., East Lansing, MI (US)

( * ) Notice: Subject to any disclaimer, the term of this patent is extended or adjusted under 35 U.S.C. 154(b) by 0 days.

(21) Appl. No.: 14/490,024

(22) Filed: Sep. 18, 2014

(65) Prior Publication Data

US 2015/0075888 A1 Mar. 19, 2015

Related U.S. Application Data

(60) Provisional application No. 61/879,490, filed on Sep. 18, 2013.

(51) Int. Cl.
*B62K 19/46* (2006.01)
*B62J 1/08* (2006.01)
*B62K 25/28* (2006.01)

(52) U.S. Cl.
CPC . *B62J 1/08* (2013.01); *B62K 19/46* (2013.01); *B62K 25/283* (2013.01); *B62K 2204/00* (2013.01); *B62K 2208/00* (2013.01)

(58) Field of Classification Search
CPC ........... B62K 2204/00; B62K 2208/00; B62K 25/283
USPC ................................................ 180/220, 65.1
See application file for complete search history.

(56) References Cited

U.S. PATENT DOCUMENTS

| | | |
|---|---|---|
| D270,436 S | 9/1983 | Gaddi |
| D273,853 S | 5/1984 | Kawashima et al. |
| D274,231 S | 6/1984 | Kawashima et al. |
| D287,833 S | 1/1987 | Moselli |
| D289,988 S | 5/1987 | Ito |
| D290,824 S | 7/1987 | Miura et al. |
| 5,101,924 A * | 4/1992 | Yamagiwa et al. ........... 180/220 |
| D331,553 S | 12/1992 | Agnolucci |
| 5,487,443 A * | 1/1996 | Thurm .......................... 180/227 |
| 5,524,726 A * | 6/1996 | Wright, Jr. .................... 180/220 |
| 5,613,569 A | 3/1997 | Sugioka et al. |
| 6,324,464 B1 | 11/2001 | Lee et al. |
| D490,750 S | 6/2004 | Hoshino |
| D491,492 S | 6/2004 | Lu |
| D514,987 S | 2/2006 | Hsiao |
| D537,756 S | 3/2007 | Kitayama et al. |
| D596,992 S | 7/2009 | Yang |
| D602,813 S | 10/2009 | Chao et al. |
| D610,490 S | 2/2010 | Wong |
| D622,637 S | 8/2010 | Schneider |
| D629,721 S | 12/2010 | Takeno et al. |
| D644,961 S | 9/2011 | Watanabe et al. |
| D647,006 S | 10/2011 | Hung |

(Continued)

*Primary Examiner* — Tony Winner
(74) *Attorney, Agent, or Firm* — Price Heneveld LLP (57) ABSTRACT

An electric vehicle, such as an electric scooter, includes a seat that is adjustable for riding in a seated or leaning riding position. The electric vehicle also includes a removable battery pack that includes the controls for the vehicle. The electric vehicle also includes a storage tub with an expandable storage area depending upon the position of the seat.

4 Claims, 10 Drawing Sheets

(56) References Cited

U.S. PATENT DOCUMENTS

| | | |
|---|---|---|
| D654,402 S | 2/2012 | Lambri et al. |
| D657,722 S | 4/2012 | Lambri et al. |
| D670,205 S | 11/2012 | Takakuwa et al. |
| D673,882 S | 1/2013 | Tartarini |
| D678,128 S | 3/2013 | Lambri et al. |
| D679,223 S | 4/2013 | Loasby et al. |
| D680,911 S | 4/2013 | Wu et al. |
| D687,741 S | 8/2013 | Zhang |
| 8,505,668 B2 | 8/2013 | Iwakami et al. |
| D690,235 S | 9/2013 | Wu et al. |
| 2004/0031632 A1* | 2/2004 | Kohda et al. ............ 180/68.5 |
| 2012/0193155 A1 | 8/2012 | Hasegawa et al. |
| 2013/0161108 A1 | 6/2013 | Watanabe et al. |

\* cited by examiner

ELECTRIC VEHICLE

CROSS REFERENCE TO RELATED APPLICATION

Applicants hereby claim the priority benefits under the provisions of 35 U.S.C. §119, basing said claim of priority on related provisional patent Application No. 61/879,490 filed Sep. 18, 2013.

BACKGROUND OF THE INVENTION

The present invention relates to an electric motor vehicle and a battery unit for an electric motor vehicle. The electric motor vehicle is a straddling type electric motor vehicle such as an electric scooter or the like. Electric motor vehicles, including electric two-wheeled vehicles such as electric scooters, are well-known in the art. Electric vehicles are generally driven by an electric motor powered by battery. The battery requires periodic charging to replenish its energy reserves when stored electric energy is depleted. The time between successive battery charging sessions is referred to as a charging cycle. The efficiency of an electric vehicle is generally determined by the distance it travels in one charging cycle.

The energy efficiency of an electric vehicle depends on the weight, speed, and acceleration of the vehicle. High-speed travel generally consumes more energy per unit of distance traveled because of increased frictional losses. Rapid acceleration and deceleration also reduce the energy efficiency. Efforts to improve efficiency include making lighter electric vehicles, designing light high-capacity batteries, and improving the aerodynamics of the vehicle. However, many of these approaches for improving efficiency significantly increase the cost of the vehicle.

With a two-wheeled vehicle, the desire to increase the energy efficiency of the electric vehicle competes with the desire to have some storage capacity on the vehicle. In addition, as vehicles are designed to become lighter in order to increase energy efficiency, riding comfort of the vehicle can become compromised. This is particularly true in the context of use of the vehicle on highways and in city traffic.

While electric vehicles, including electric vehicles, have proven to be successful, they have drawbacks concerning storage capacity, comfortable seating in both highway and city settings, and the distance the electric vehicle can travel in one charging cycle, such that further improvements and enhancements to the same would be clearly advantageous and are disclosed herein.

SUMMARY OF THE INVENTION

One aspect of the present invention is an electric vehicle having a plurality of wheels. The electric vehicle has a seat that is adjustable between a reclined position and an inclined position. The electric vehicle has a battery pack with an integrated control system. The integrated control system has three controller functions all on one board. The three controller functions are a DC to DC converter, a motor controller, and a system controller. The battery pack also has a battery management system that is integrated with the battery charger.

The electric vehicle can include any combination of one or more of the following additional features:
  A storage tub that can expand based upon the position of the seat
  A secure under seat storage area
  A sealed storage area
  A seat lift linkage
  A torsion bar suspension
  An expansive flat-foot space for carrying cargo
  A navigation system
  Docking stations for phones, including smart phones
  Storage cubby
  Display monitor
  A motor seat lift
  A pneumatic seat lift These and other advantages of the invention will be further understood and appreciated by those skilled in the art by reference to the written specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof, shall relate to the invention as oriented in the attached drawings. However it is to be understood that the invention may assume various orientations in step sequences, except where expressly specified to the contrary. It is also to be understood that the specific devices and processes illustrating the attached drawings, and described in the following specification, are simply exemplary embodiments of the inventive concepts to find any appended claims. Hence, specific dimensions and other physical characteristics relating to the embodiments disclosed herein are not to be considered as limiting, unless the claims expressly state otherwise.

Reference numeral 2 generally designates an electric vehicle embodying an aspect of the present invention. The electric vehicle 2 has a plurality of front wheels 4 and rear wheels 5 coupled to the front 3 of the electric vehicle 2. In the illustrated embodiments (FIGS. 1-4, 17, 20 and 21) the electric vehicle 2 has a single front wheel 4 and a single rear wheel 5. The wheels 4, 5 are conventional wheels that can be used on a vehicle or motorcycle and can vary in diameter depending on the overall size of the vehicle. The size of both wheels 4, 5 does not need to be the same. For example, the front wheel can be larger than the rear wheel.

Figure 1:
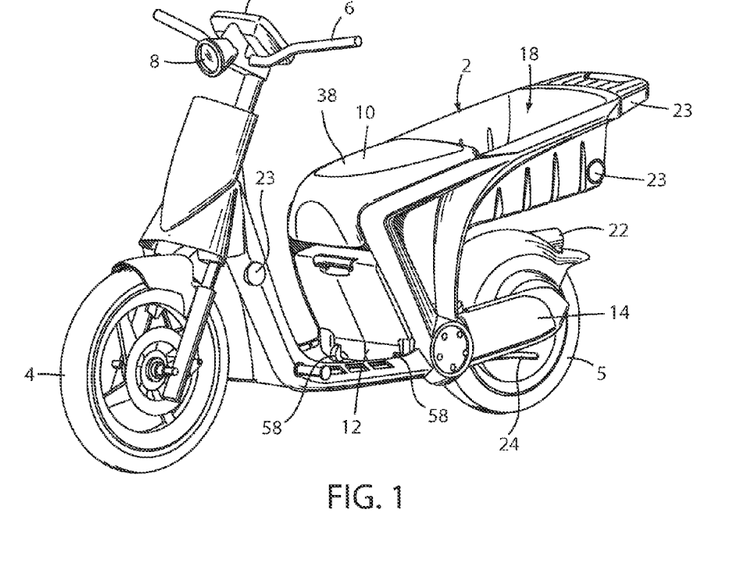
FIG. 1 is a front perspective view of a two-wheeled motor vehicle in an embodiment of the present invention.
Figure 2:
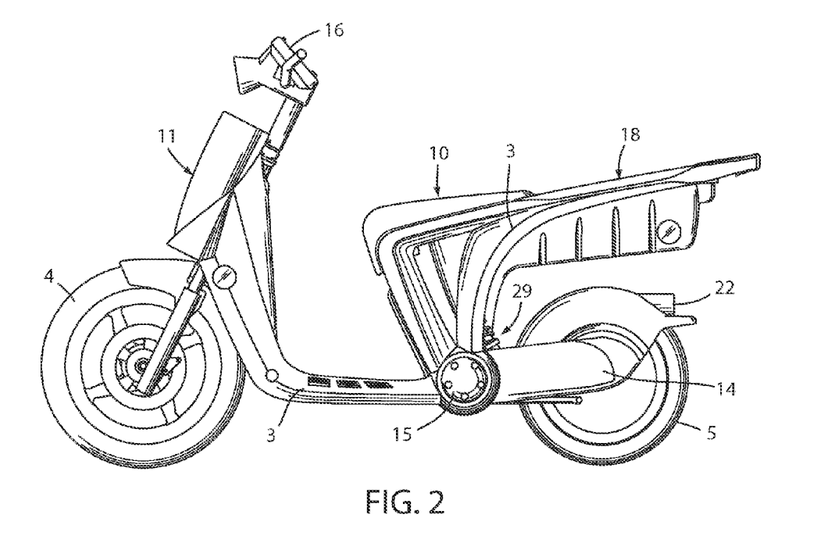
FIG. 2 is a left side view of the motor vehicle shown in FIG. 1.
Figure 3:
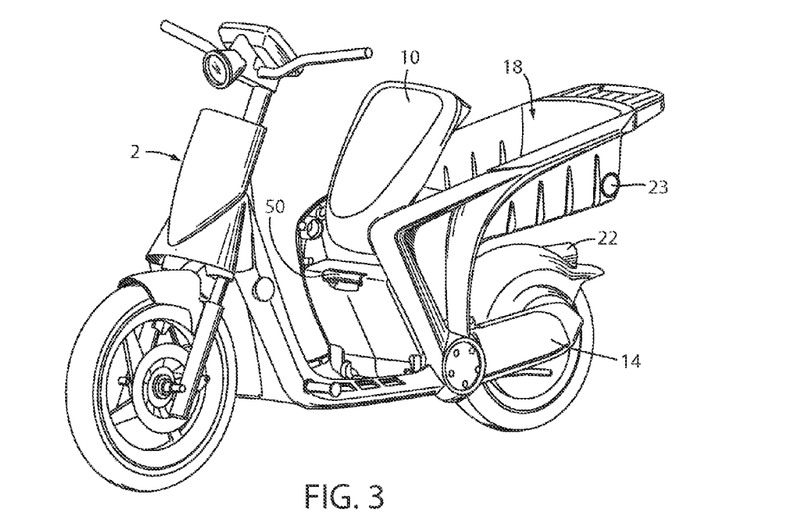
FIG. 3 is a perspective view of the motor vehicle shown in FIG. 1 with the seat assembly in an inclined position.
Figure 4:
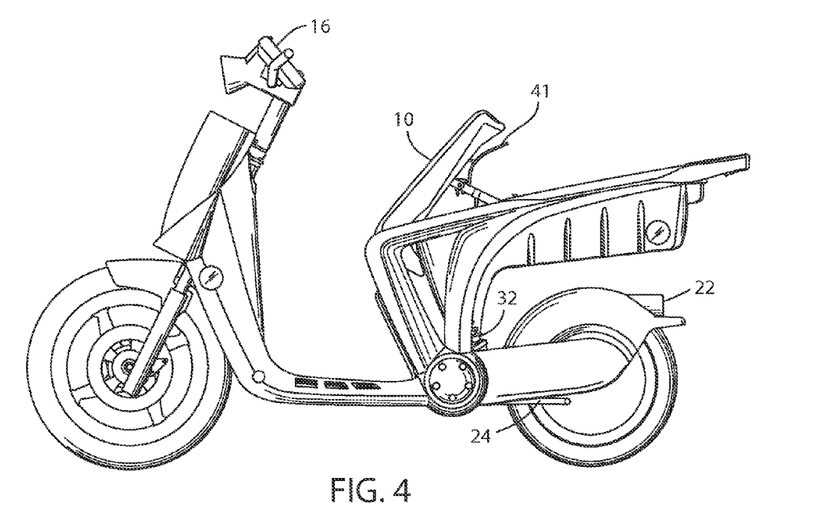
FIG. 4 is a left side view of the motor vehicle shown in FIG. 3.
Figure 15:
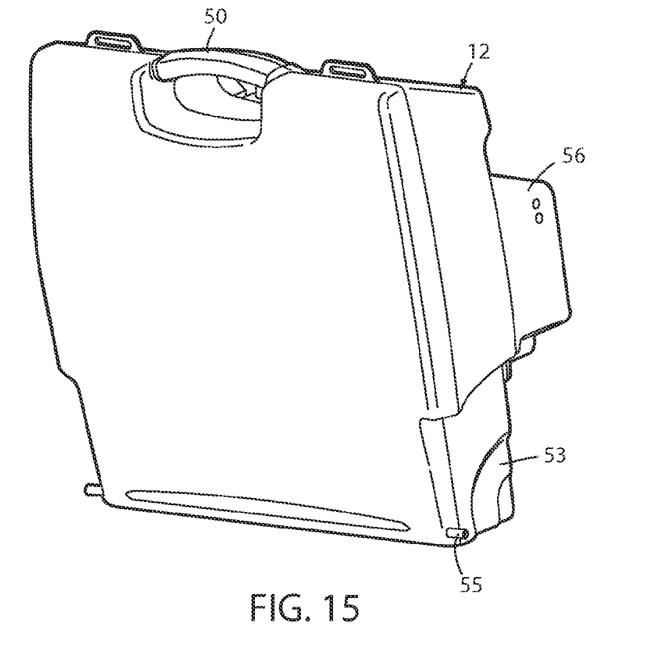
FIG. 15 is a front perspective view of the battery pack in an embodiment of the invention.
Figure 16:
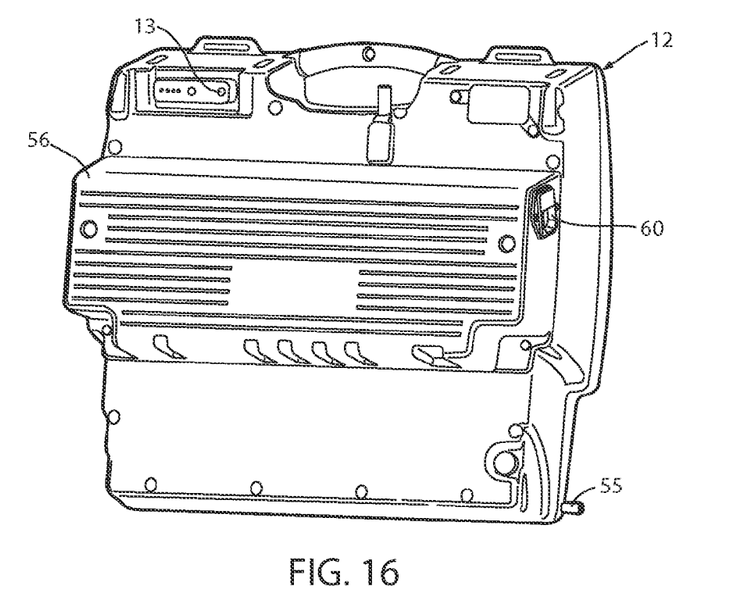
FIG. 16 is a rear perspective view of the battery pack shown in FIG. 15.
Figure 17:
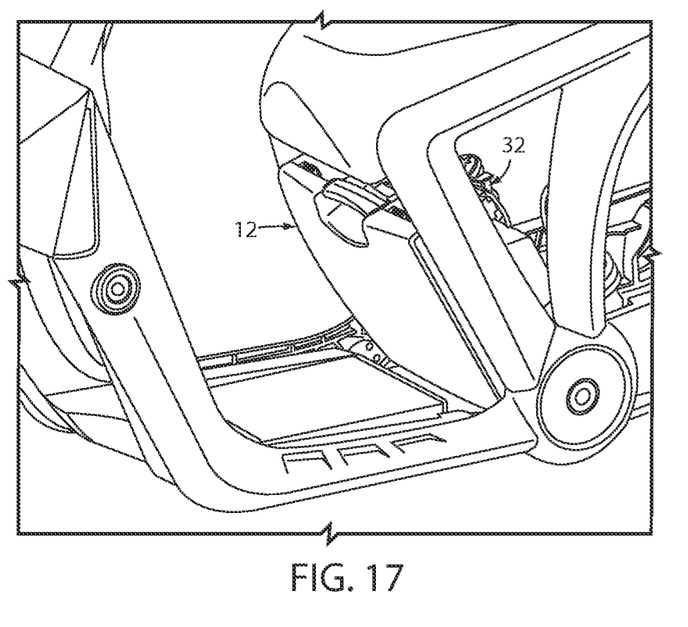
FIG. 17 is a partially fragmented left side perspective view of a motor vehicle with the battery pack inserted.
Figure 18:
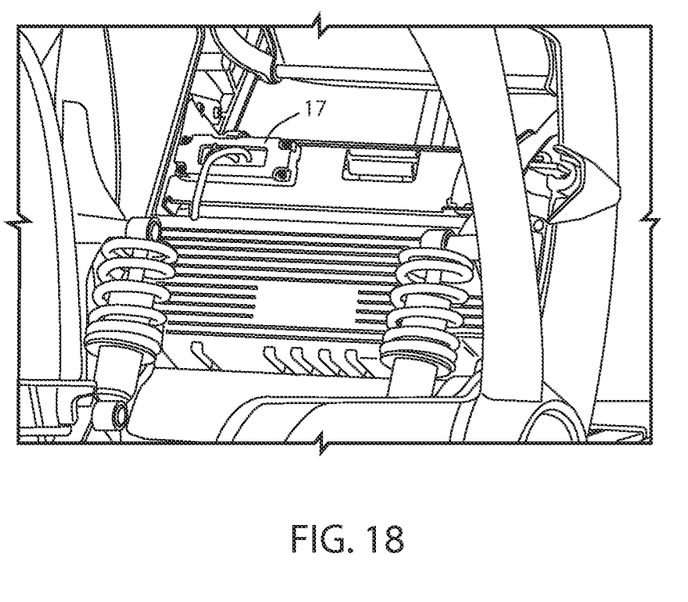
FIG. 18 is a partially fragmented rear perspective view of the battery pack when inserted into the motor vehicle.
Figure 19:
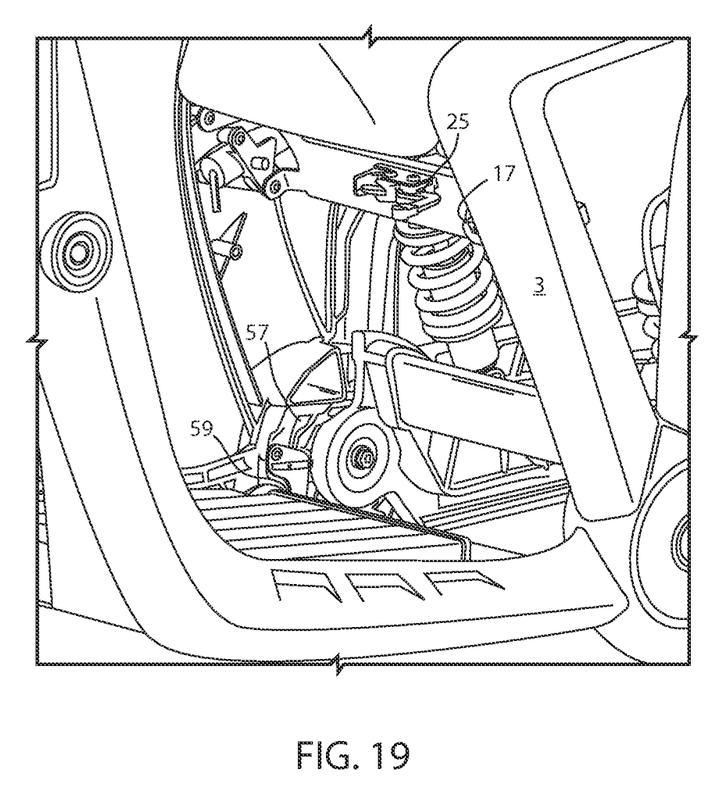
FIG. 19 is a partially fragmented left side perspective view of a motor vehicle with the battery pack removed.

The vehicle 2 also includes a battery pack 12 for powering the vehicle 2. The removable battery pack 12 includes rechargeable cells with an integrated charger 56 as shown in FIGS. 15 and 16. In addition, the battery pack 12 may have a battery management system and/or an integrated control system with three controller functions all on one board: a DC to DC converter, a motor controller, and system controller. If the battery pack includes the integrated control system, the removal of the battery pack 12 not only deprives the vehicle 2 of power, but also removes the controls necessary to operate the vehicle 2. The battery pack 12 can be removed and carried to an outlet where it can be plugged in to charge the battery cells via socket 60, shown in FIG. 16. The battery pack 12 can be configured to be plugged into a 110v or 220v outlet depending upon the regional standard for voltage. In addition, the battery pack 12 can come with a converter in order to convert the 110v to 220v or vice versa. As shown in FIGS. 1 and 3, the battery pack 12 may include wheels 58 and a handle 50 to help facilitate movement of the battery pack 12 to and from the vehicle 2. The battery pack 12 connects to the electric vehicle 2 via a connector 17, shown in FIG. 18, via a corresponding port 13 on the battery pack 12, shown in FIG. 16. The battery pack 12 can be engaged onto the vehicle 2 by means of pins 55 which are received into corresponding slots 59 on the frame 3 of vehicle 2 as shown in FIGS. 15, 16, and 19. The battery pack 12 can have a profiled surface 53 that closely mates with a corresponding profiled surface 57 on the frame 3 of vehicle 2. A clip 25 can also be included as part of, or included in an attachment to, the frame 3 to engage a portion of the battery pack 12.

The frame 3 of the electric vehicle 2 can be made of any suitable material. The illustrated embodiment is made from aluminum castings. The frame 3 is also designed to have a lower floor 34 and higher handlebars 6 so that the frame 3 supports the leaning riding position when the seat assembly 10 is inclined, as discussed below.

Figure 5:
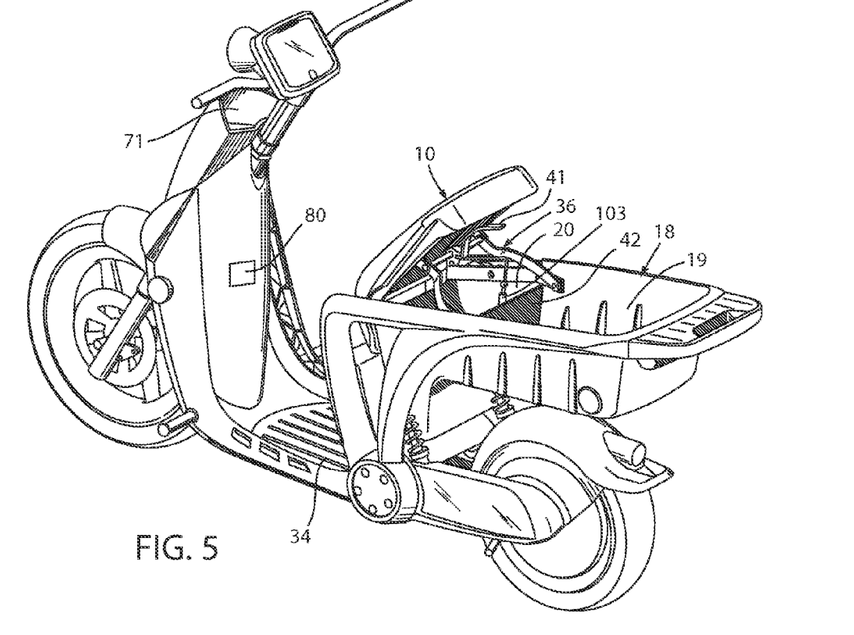
FIG. 5 is a rear perspective view of the motor vehicle shown in FIGS. 3 and 4.

The electric vehicle 2 has multiple storage areas. The large, low and flat floor 34 at the front of the electric vehicle 2 can act as a storage area. In addition, a tray 71 may be included on the steering column 11. The tray 71 can include cup holders and a docking/charging/retention station for cell phones and other devices. A storage tub 18 is located in the rear of the vehicle 2, as shown in FIGS. 1-10. A storage area/cubby 80 may also be included directly in the front of the vehicle, as shown in FIG. 5. This storage area 80 can include a docking/charging/retention station for cell phones and other devices.

Figure 6:
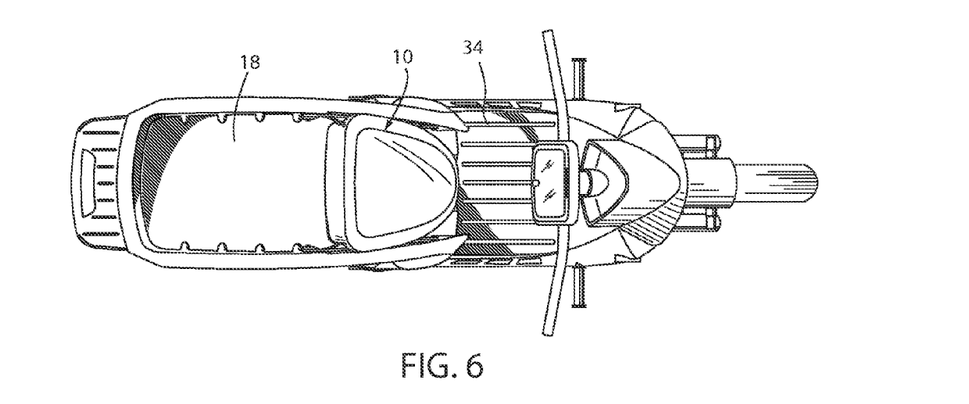
FIG. 6 is a top perspective view of the motor vehicle shown in FIG. 5.
Figure 7:
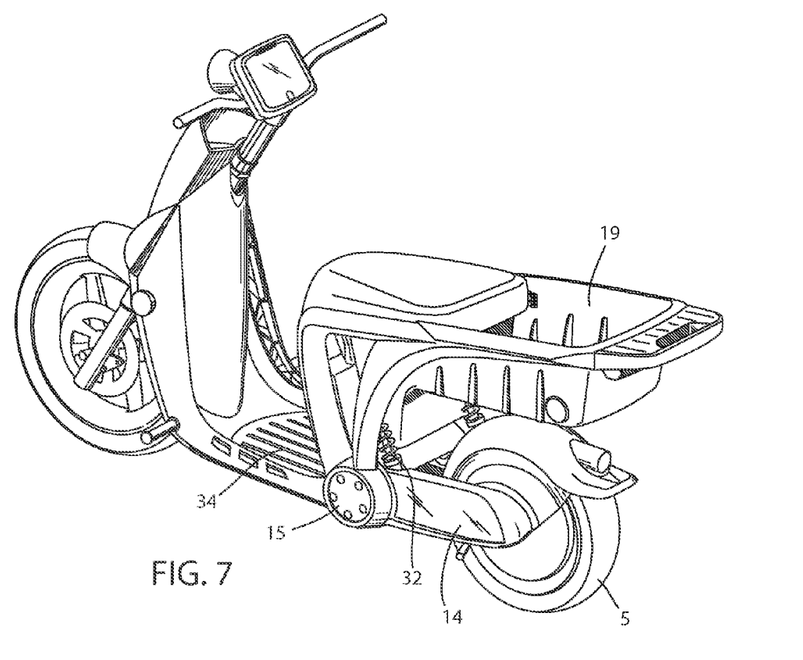
FIG. 7 is a rear perspective view of the motor vehicle shown in FIG. 1.
Figure 8:
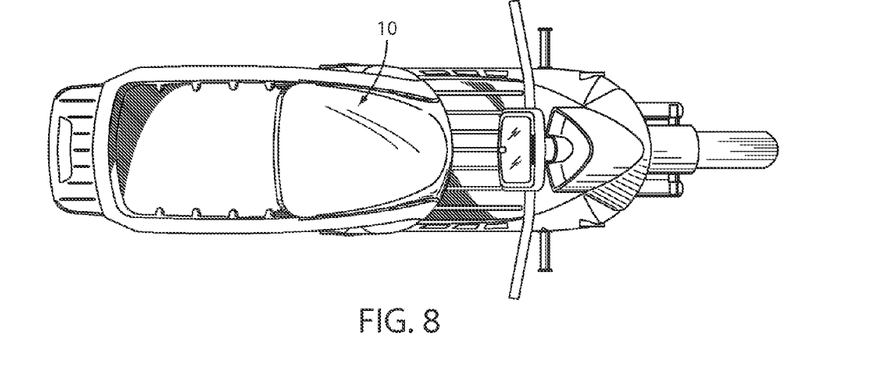
FIG. 8 is a top perspective view of the motor vehicle shown in FIG. 7.
Figure 9:
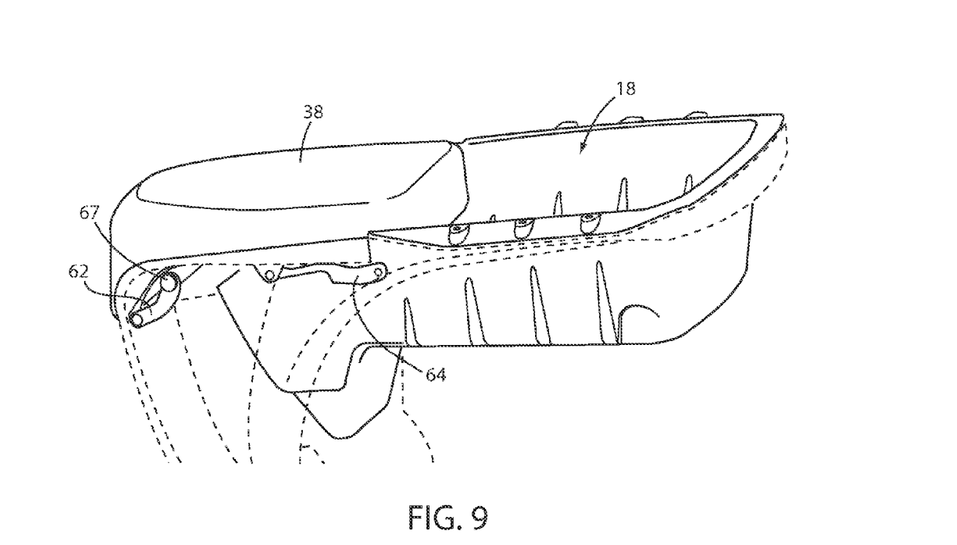
FIG. 9 is a perspective view of another embodiment of the seat lift linkage with the frame shown in phantom.
Figure 10:
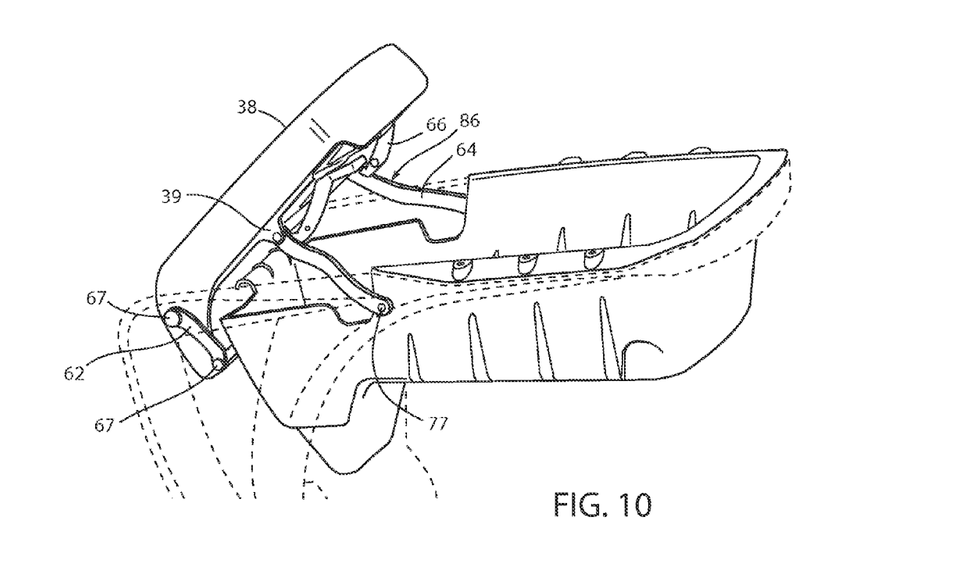
FIG. 10 is a perspective view of the seat lift linkage of FIG. 9, shown with the seat assembly in an inclined position, with the frame shown in phantom.
Figure 11:
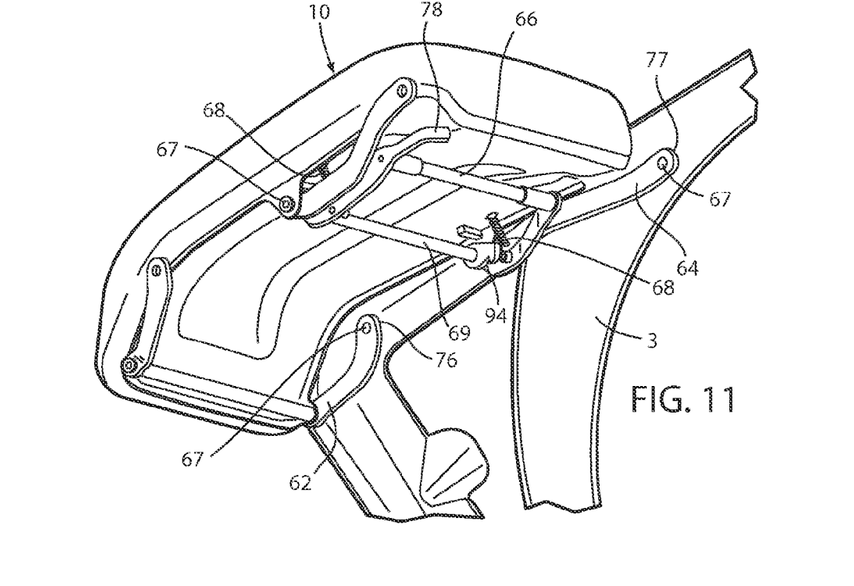
FIG. 11 is a perspective view of the seat lift linkage of FIGS. 9 and 10, showing only the side of the frame.
Figure 12:
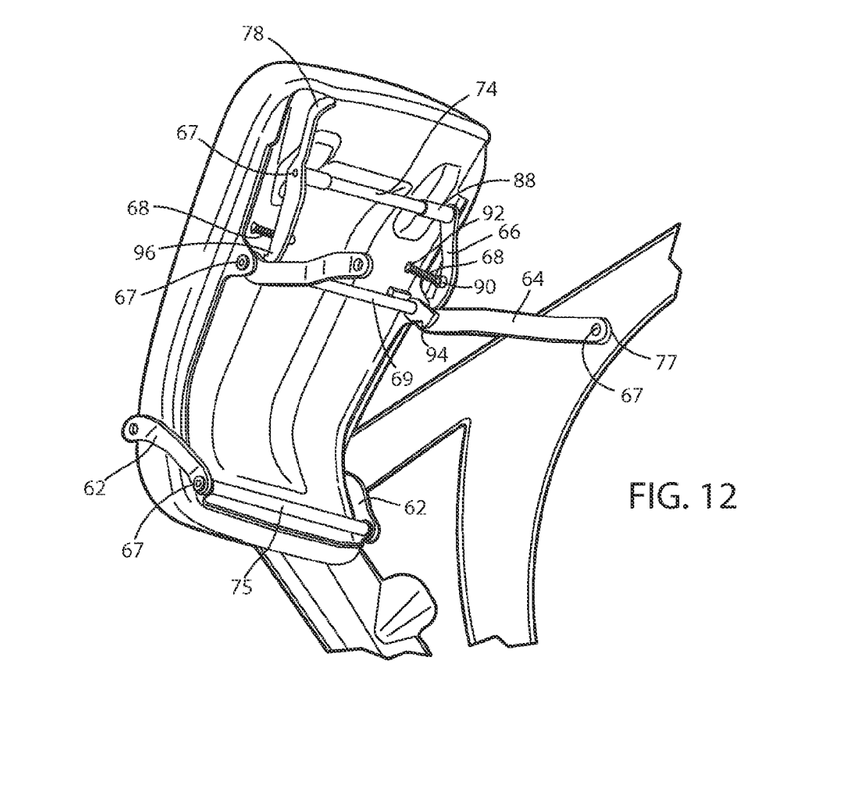
FIG. 12 is a perspective view of the seat lift linkage of FIGS. 9-11, with the seat assembly in an inclined position, showing only one side of the frame.

The rear storage tub 18 acts as an expandable storage area. The storage tub 18 includes two storage areas, one, 20, under the seat assembly 10 and one, 19, rearward of the seat assembly 10. A divider 42 can be inserted into the storage tub 18 to further define these two areas 19, 20. The divider 42 can be removable, as shown in FIGS. 6 and 10. In addition, the divider 42 can include a lock to secure the under seat storage 20 when the seat assembly 10 is in a reclined position thus forming a closed compartment. The locking mechanism can included any conventional locking mechanism, including, but not limited to, keyed, remote, biometric, and combination locks that connect the divider 42 to the seat assembly 10. The rearward storage area 19 can be made into larger open storage space by removing the divider 42 and by raising the seat assembly 10, as shown in FIGS. 6 and 10. A cover may be used to cover the storage tub 18, including storage area 19. The cover can be a hard or soft cover and may provide a flexible weatherproof seal to the tub 18 when used.

The seat assembly 10 is connected to the frame 3 of the vehicle 2 in a hinged manner such that the seat assembly 10 can be in a reclined, generally flat or horizontal position, and inclined position. As illustrated in FIGS. 9-12, the seat assembly 10 includes a padded seat 38 connected to a seat frame 39 that connects to a seat lift linkage 36. The seat lift linkage 36 permits the seat assembly 10 to rotate from a generally horizontal position to an inclined position with respect to the seat frame 3 of vehicle 2. One embodiment of the seat lift linkage 36 includes the use of a gas strut 103 in combination with a lever 41, as shown in FIG. 5. That seat lift linkage 36 includes a number of rotatable pieces that connect the seat assembly 10 to the frame 3 and/or tub 18. In this embodiment, the seat lift linkage 36 is manually operated by operation of the lever 41. A lever 41 is used to unlatch the seat. As soon as the seat assembly 10 is unlatched, the stored energy in gas strut 103 is released and the seat assembly 10 automatically goes into the inclined position until lever 41 latches the seat assembly 10 in an upper position. In this embodiment, the latch 41 has two locked positions, one up and one down. However, additional locking positions may be used to create different stages of inclination of the seat assembly 10. To reverse the process, the user has to actuate the lever 41 and manually push the seat assembly 10 down, returning the stored energy into the gas strut 103 until lever 41 latches the seat in a lower locked position. The seat lift linkage 36 can alternatively be motorized and/or use a pneumatic member.

In another illustrated embodiment, the seat lift linkage 86 includes a front linkage 62, a rear linkage 64, and a lever assembly 66, as shown in FIGS. 9-12. The front linkage 62 connects to the frame 3 at point 76 via fasteners 67. The front linkage 62 also connects to the seat frame 39 via fasteners 67. The bar 75 that is in between the connections between the front linkage 62 and the seat frame 39 can be an integral part of the seat frame 39 or a separate piece. The fasteners 67 may extend into the interior of the bar 75. Thus, the front linkage 62 connects to the frame 3 at two points and the seat frame 39 at two points through a bar 75. The rear linkage 64 connects to the frame 3 at connector points 77 via fasteners 67. The rear linkage 64 also connects to the seat frame 39 with fasteners 67. A bar 69 is in between the connections between the rear linkage 64 and the seat frame 39. The bar 69 can be an integral part of the seat frame 39 or a separate piece. The fasteners 67 may extend into the interior of the bar 69. The lever assembly 66 includes a bar 74 that is connected to the seat frame 39 through tubes 88 within the seat frame 39. Fasteners 67 are used to connect the lever assembly 66 to the seat frame 39 in the area of the bar 74. The lever assembly 66 includes a lever handle 78. A plurality of springs 68 connect to the seat frame 39 and to the lever assembly 66 at points 92, 90, respectively. The lever assembly 66 can include a surface 96 that engages a surface 94 on the rear linkage 64 when the seat assembly 10 is in a horizontal position. Actuation of the lever handle 78 can disengage the locking relationship between the surfaces 94, 96 so that the seat assembly 10 may raise to an inclined position. Also, when the lever handle 78 is actuated, the energy stored in the springs 68 allow the seat assembly 10 to raise to a plurality of inclined positions.

While the illustrated embodiments show the lift linkages 36, 86 connected to the seat assembly 10 at six points, the seat assembly 10 may be connected to the seat lift linkage 36 by any number of connections depending upon the configuration of the seat frame 39 and the seat lift linkage 36 provided that the kinematic relationship of the seat 10 and seat lift linkage 36 is not restricted. In addition, the seat lift linkage 36 may be attached to the tub 18 and/or frame 3 in any number of spots, despite the fact that the illustrated embodiment shows four points of attachment at posts 76, 77.

Figure 13:
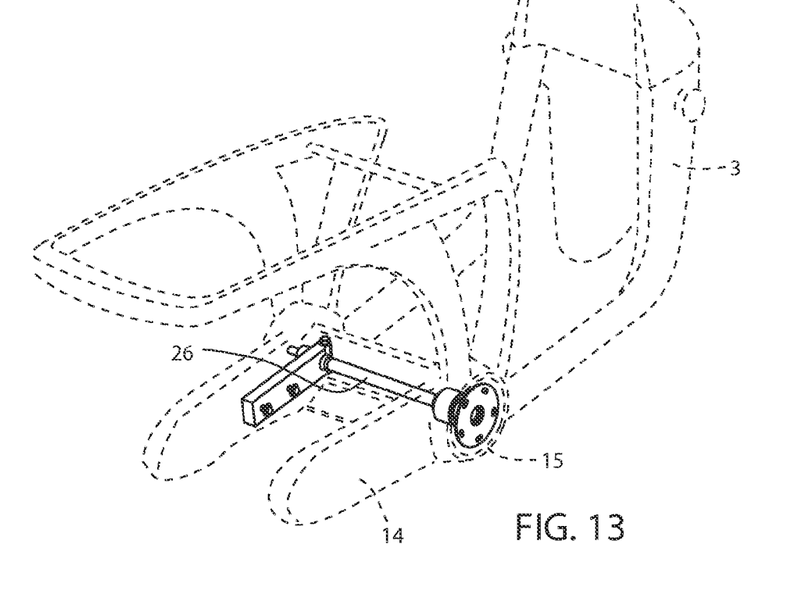
FIG. 13 is a perspective view of the torsion bar suspension when the frame showing in phantom.
Figure 14:
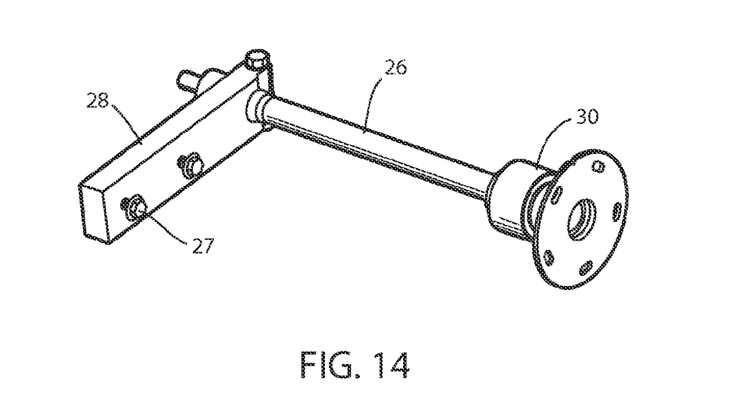
FIG. 14 is a perspective view of the torsion bar suspension system.

As discussed above, the seat lift linkage 36 allows the seat assembly 10 to move to an inclined position that will raise the back of the seat assembly 10. When the seat assembly 10 is in a reclined position, the rider can ride the vehicle 2 in a seated position. When the seat assembly 10 is in a reclined position, if the divider 42 is in place, a sealed storage area 20 is created underneath the seat assembly 10. The sealed storage area 20 can further be made waterproof by creating a seal on the underside of the seat assembly 10 and/or on the top side of the forward storage area 20. The seat assembly 10 gets vertical support from the seat lift linkages 36, 86 and the motorized or pneumatic assembly if used.

bly 14 to rotate about pivot point 15. In one illustrated embodiment (FIGS. 2-7), the suspension system 29 is a plurality of coil springs 32. The suspension system 29 can also include a torsion bar 26 suspension system as shown in FIGS. 13 and 14 that provides suspension alone or in combination with springs 32. The torsion bar suspension system 26 by itself offers a much more minimalist appearance than what is possible using coil springs 32 (FIG. 7) and frees up space under the seat assembly 10 for more storage capacity. The torsion bar 26 is fixed to the frame 3 on one end and to the swing arm assembly 14 on the other end, as shown in FIGS. 13 and 14. Fasteners 27 may be used to connect one or more of the connectors 28, 30 to the frame 3 or swing arm assembly 14. In addition, the connector 30 may connect at pivot point 15, such that the torsion bar is fixedly attached to the pivot point 15 in the frame 3.

The handle bars 6 can include the acceleration and braking controls for the electric vehicle 2. Cruise control can also be incorporated into the handle bars. The electric vehicle 2 has a headlight 8, taillight 22, and turn signals 23. The headlight 8 and taillight 22 can take on different shapes and sizes. The turn signals 23 can also be located at various points on the vehicle 2 and can take on different shapes and sizes.

The electric vehicle 2 includes a display 16 that can include, among other information, speed, battery life, mileage, etc. The display 16 can also display navigational information and videos, can play music, and can link with data devices, including cell phones.

Specifications for the electric vehicle 2 can include:

| | | |
|---|---|---|
| Performance | Top Speed | 30 mph (48.3 kph) |
| | Range | Minimum of 30 miles (48.3 kilometers) per charge |
| | Driving mode | Sport mode (High performance) |
| | | Economy mode (Range maximizing) |
| | | Easy mode (New rider orientation) |
| | Acceleration | 0 mph to 30 mph <8 seconds (170 lb rider and 20 lbs cargo) |
| Battery | Battery type | Removable Li-ion battery pack |
| | Battery capacity | 1.6 kWh nominal |
| | Voltage | 58.8 VDC at max charge and 42 VDC at min charge - 52 V nominal |
| | Charge Time | 100% in 3.5 hours |
| | Charger input power | 110 V AC 5 amps |
| | Charger output | Up to 60 VDC and 500 W |
| | Battery life cycle | 800 cycles to 80% of initial capacity |
| Motor | Peak Torque [Nm] | 130 Nm |
| | Motor Type | Brushless permanent magnet hubmotor |
| | Climbing Performance | Up to 20% grade (Assuming 20 mph for 0.5 mile, then at 15 mph) |
| Structural | Frame | Cast, welded, and powder-coated aluminum exoskeleton |
| | Suspension | Telescopic oil dumped front fork with internal coil springs, twin oil sumped coil over shock rear swing arm suspension |
| | Brakes | Single piston hydraulic disc brakes front and rear |
| | Regenerative braking | Yes |
| | Tire-Front | 100/80-R16 |
| | Tire-Rear | 130/70-R12 |
| | Curb Weight | 215 lbs. (97.5 kg.) |
| | Seat Height | 29.5 inches (749 mm) |
| | Ground clearance at max load | 5.5 inches (139 mm) |
| | Carrying capacity | 275 lbs rider plus cargo (125 kg) |
| | Wheelbase | 50 inches (1267 mm) |
| User Interface | Instrumentation | 7" inch touchscreen monitor with controls including odometer, speed, energy consumption, battery status, estimated range amd CO2 reduction |
| | | Pin code security lock |
| | | On-board owners manual |
| Lighting | All | All LED lights with 8.5% lower energy consumption |
| Auxillary Power | | Connections in front and rear for 12 v charging |
| Emissions | | Zero |

The electric vehicle 2 has a swing arm assembly 14 that is coupled to the frame 3 at pivot point 15. The rear wheel 5 is coupled to the swing arm assembly 14. The swing arm assembly 14 is also coupled to the frame 3 via a suspension system 29. The suspension system 29 permits the swing arm assem- As will be appreciated by those skilled in the art, the electric vehicle 2 can have two wheels, as shown in the attached drawings, or can have three or more wheels. Other features that are known for scooters, such as a kick stand 24, can be included with the disclosed electric vehicle.

In the foregoing description, it will be readily appreciated by those skilled in the art that modifications may be made to the invention without departing from the concept disclosed herein. Such modifications are to be considered included in the following claims, unless these claims by their language expressly state otherwise.

The invention claimed is:

1. An electric vehicle having a plurality of wheels comprising:
    a frame;
    at least one front wheel coupled to the front of said frame;
    a swing arm assembly coupled to said frame;
    a suspension system coupled to said frame and said swing arm assembly, permitting said swing arm assembly to rotate about a pivot point where said swing arm assembly and said frame are coupled;
    at least one rear wheel coupled to said swing arm assembly;
    a removable battery pack for powering the vehicle;
    a seat that is coupled to the frame, adjustable from a generally flat orientation to an inclined position; and
    a storage tub including a removable divider for dividing the storage tub into a forward under seat storage area and a rearward open storage area.

2. The electric vehicle as set forth in claim 1, wherein the forward under seat storage area is lockable.

3. An electric vehicle having a plurality of wheels comprising:
    a frame;
    at least one front wheel coupled to the front of said frame;
    a swing arm assembly coupled to said frame;
    a suspension system coupled to said frame and said swing arm assembly, permitting said swing arm assembly to rotate about a pivot point where said swing arm assembly and said frame are coupled;
    at least one rear wheel coupled to said swing arm assembly;
    a seat assembly that is coupled to the frame by a seat linkage, allowing the seat to adjust from a generally flat orientation to an inclined position; and
    a storage tub including a removable divider for dividing the storage tub into a forward under seat storage area and a rearward open storage area.

4. The electric vehicle as set forth in claim 3, wherein the forward under seat storage area is lockable.

* * * * *